(12) United States Patent
Di Sirio et al.

(10) Patent No.: US 8,191,790 B2
(45) Date of Patent: Jun. 5, 2012

(54) APPARATUS AND METHOD FOR INITIALIZING AN IC CARD

(75) Inventors: Giovanni Di Sirio, Salerno (IT); Giovanni Fontana, Naples (IT)

(73) Assignee: Incard S.A., Geneva (CH)

( * ) Notice: Subject to any disclaimer, the term of this patent is extended or adjusted under 35 U.S.C. 154(b) by 559 days.

(21) Appl. No.: 12/413,162

(22) Filed: Mar. 27, 2009

(65) Prior Publication Data

US 2009/0242648 A1    Oct. 1, 2009

(30) Foreign Application Priority Data

Mar. 28, 2008  (IT) .............................. MI2008A0537

(51) Int. Cl.
*G06K 19/06* (2006.01)
(52) U.S. Cl. ......... 235/492; 235/380; 235/451; 235/486
(58) Field of Classification Search .................. 235/451, 235/492, 375, 380, 487
See application file for complete search history.

(56) References Cited

U.S. PATENT DOCUMENTS

| | | | | |
|---|---|---|---|---|
| 4,742,215 A | * | 5/1988 | Daughters et al. | 235/487 |
| 4,804,825 A | * | 2/1989 | Bitoh | 235/380 |
| 5,317,690 A | * | 5/1994 | Krzycki et al. | 713/400 |
| 5,434,395 A | | 7/1995 | Storck et al. | 235/380 |
| 6,824,063 B1 | * | 11/2004 | Wallace et al. | 235/487 |
| 2004/0124250 A1 | * | 7/2004 | Kojima et al. | 235/492 |

FOREIGN PATENT DOCUMENTS

| | | |
|---|---|---|
| DE | 19508722 | 9/1996 |
| EP | 1403809 | 3/2004 |
| EP | 1662425 | 5/2006 |
| EP | 1873962 | 1/2008 |
| FR | 2681165 | 3/1993 |
| FR | 2873467 | 1/2006 |
| FR | 2875656 | 3/2006 |
| WO | 2006013162 | 2/2006 |

* cited by examiner

*Primary Examiner* — Tuyen K Vo
(74) *Attorney, Agent, or Firm* — Allen, Dyer, Doppelt, Milbrath & Gilchrist, P.A.

(57) ABSTRACT

An apparatus for storing initialization data in an IC Card, including a non-volatile memory, whereto the initialization data is addressed, and a plurality of pins including pins for connecting the apparatus and at least one I/O pin for receiving the initialization data, the apparatus includes an initialization card. The initialization Card includes a respective non-volatile memory unit, wherein the initialization data is stored, and the plurality of pins including the I/O pin and the pins for connecting the apparatus. The I/O pin of the initialization Card is connected to a respective I/O pin of the apparatus for receiving an initialization signal. A connection from at least a predetermined pin of the initialization Card to the at least one pin of the IC Card is provided for transmitting the initialization data from the initialization Card to the IC Card, upon reception of the initialization signal.

17 Claims, 2 Drawing Sheets

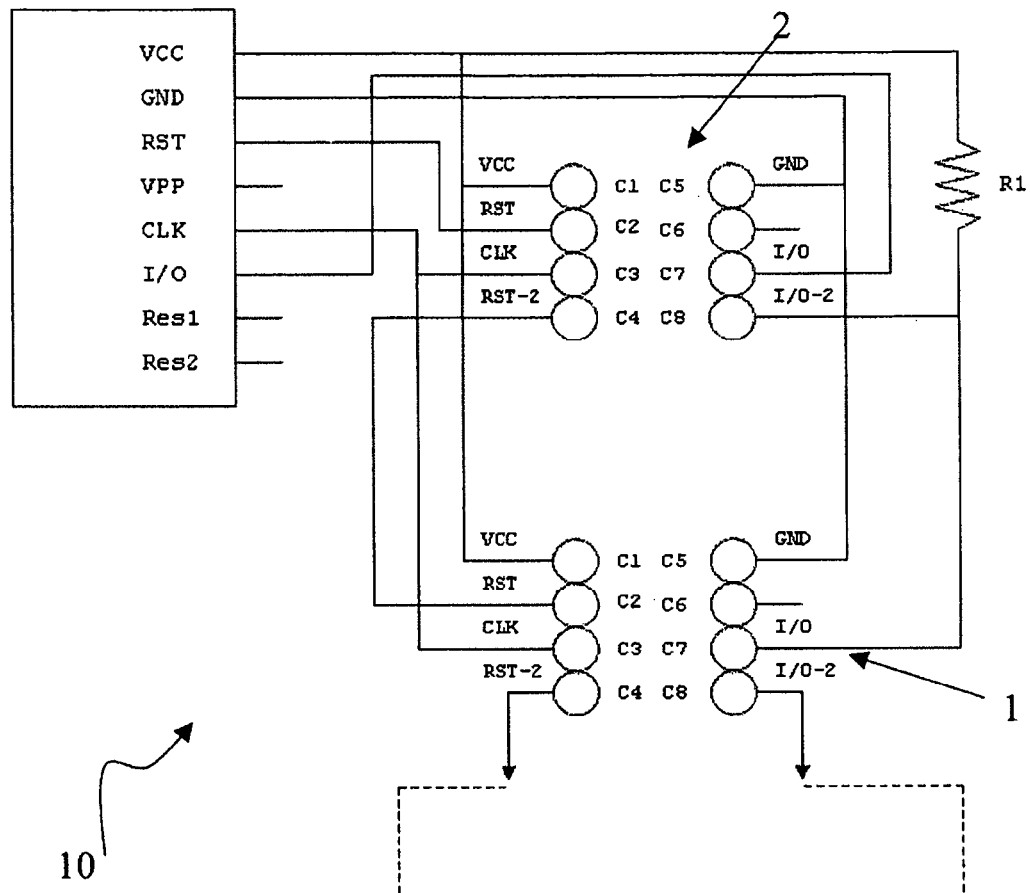
Fig. 3
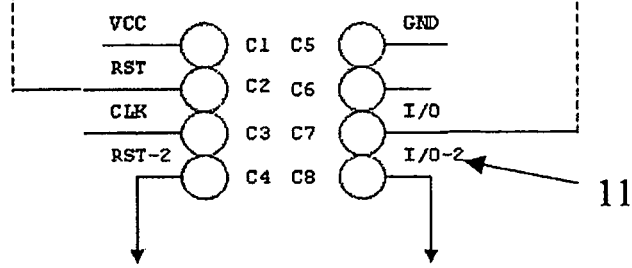

APPARATUS AND METHOD FOR INITIALIZING AN IC CARD

FIELD OF THE INVENTION

The present invention relates to an apparatus for storing initialization data in an Integrated Circuit (IC) Card including a non-volatile memory, whereto the initialization data are addressed, and a plurality of pins for connecting the IC Card to the apparatus and receiving the initialization data. The present invention also relates to a method for storing initialization data in an IC Card including a non-volatile memory, whereto the initialization data is addressed, and a plurality of pins for receiving the initialization data, the IC Card being connected to an apparatus for the initialization.

BACKGROUND OF THE INVENTION

As may be known, initialization of an Integrated Circuit (IC) Card includes storing of initialization data inside a non-volatile memory portion of the IC Card. The initialization data is provided from a customer to a provider of IC Cards and is loaded into an initialization device, intended to be connected to the IC Card for transmitting the initialization data.

More particularly, the initialization device may include a set of commands programmed to address the initialization data to the IC Card and for storing such data into the non-volatile memory portion. Since the initialization data may include information associated with the customer, including secret information, it is important to avoid widespread distribution of such data. Both the customer and the provider may read the initialization data because it is provided by the customer, but loaded by the provider into the initialization device.

A first problem occurs when the provider commits the initialization of the IC Cards to a third party, i.e. to a manufacturer of the IC Card, for example, located in a different department with respect to the provider. In fact, since the provider has to transmit the initialization data to the manufacturer, the manufacturer may read the initialization data associated with the customer.

This problem described, for example, with reference to a provider and a manufacturer, typically always occurs when more than one department participates to the development or production of an IC Card and typically requires the initialization of the IC Card to a third party responsible to initialize the IC Card. In fact, the initialization data is prepared from a first department, sent to the department responsible to prepare the initialization device, and then transmitted from the initialization device to the IC Card.

The problem is that of providing a method and a corresponding device for initializing an IC Card without loading the initialization data into the initialization device, so avoiding a transmission of initialization data for programming the initialization device and avoiding a widespread distribution of secret information associated to the customer, overcoming the limits that currently affects the initialization of IC Cards.

SUMMARY OF THE INVENTION

The approach on which the present embodiment is based, is that of enclosing the initialization data into an initialization Card and to connect the initialization Card together with the IC Card to be initialized to an apparatus having the purpose of interconnecting such Cards and enabling the initialization Card for the transmission of the initialization data. According to such an idea, this problem is addressed by an apparatus for storing initialization data in an IC Card. The IC Card includes a non-volatile memory, whereto the initialization data is addressed, and a plurality of pins including pins for connecting the apparatus and at least one I/O pin for receiving the initialization data. The apparatus includes an initialization card including a respective non-volatile memory unit, wherein the initialization data is stored, and also including the plurality of pins including the I/O pin and the pins for connecting the apparatus. The I/O pin is connected to a respective I/O pin of the apparatus for receiving an initialization signal. The apparatus also includes at least a connection from at least a predetermined pin of the initialization Card to the at least one pin of the first IC Card, for transmitting the initialization data from the initialization Card to the first IC Card upon reception of the initialization signal.

This problem is also addressed by a method for storing initialization data in an IC Card including a non-volatile memory, whereto the initialization data is addressed, and a plurality of pins for receiving the initialization data. The IC Card is connected to an apparatus for the initialization. The method includes providing an initialization Card, storing the initialization data into a respective non-volatile memory portion and an initialization program for transmitting the initialization data from the initialization Card to the IC Card. The method also includes connecting the initialization Card to the apparatus, so that the IC Card is connected to the initialization Card. The method further includes transmitting an initialization signal from the apparatus to the initialization Card for activating the initialization program.

According to such an apparatus and method, the problem is also addressed by an initialization Card for setting initialization data of an IC Card. The initialization Card includes a non-volatile memory unit, storing the initialization data, and a plurality of pins including a pin for connecting an apparatus, and at least an I/O pin for receiving an initialization signal from the apparatus. The initialization Card includes an initialization program for transmitting, through predetermined pins, the initialization data upon receipt of the initialization signal from the apparatus.

Advantageously, the apparatus is typically not programmed to receive the initialization data and to transmit such initialization data to the IC Card. A transmission of initialization data to the initialization device may be avoided.

Advantageously, the apparatus is used generally only for enabling the initialization Card to transmit the initialization data. In this way, the initialization of IC Cards may be committed to a third party without disclosing the initialization data, since the third party receives the initialization Card and is typically unable to read the content of such initialization Card.

Advantageously, the initialization Card may be protected according to conventional measures, for example, cryptography, associated to the IC Card, so that the secret information included in the initialization data and associated to the customer benefits for such protection. Further characteristics and advantages of the apparatus and the method will be apparent from the following description of an embodiment thereof, made with reference to the annexed drawings, given for indicative and non-limiting purposes.

BRIEF DESCRIPTION OF THE DRAWINGS

FIG. 3 schematically shows the cascade connection of FIG. 2.

DETAILED DESCRIPTION OF THE PREFERRED EMBODIMENTS

According to the present invention and with reference to the annexed drawings, an apparatus for storing initialization data in an IC Card is schematically represented and globally indicated with numeral reference 10. The IC Card 1 includes a non-volatile memory 1a, whereto the initialization data is addressed, and a plurality of pins including pins VCC, GND, CLK for an electrical connection between the IC Card and the apparatus 10. The plurality of pins also includes at least one pin I/O, RST for receiving the initialization data.

The plurality of pins of the IC Card 1 is substantially a set of conventional pins, compliant with an international standard for the IC Card 1. According to the standard, the connection between a reader device and the IC Card 1 is based on a subset of the plurality of pins while a couple of predetermined pins RST-2, I/O-2 are substantially unused.

The initialization data is secret data, for example, initialization data provided by a customer, intending to purchase the IC Card from a manufacturer, responsible for initializing the IC Card with the customer's initialization data before selling it. With reference to the example above, it is important that the initialization data is kept secret by the manufacturer, avoiding its disclosure also during the initialization of the IC Card 1.

According to the present embodiments, the apparatus 10 includes an initialization Card 2 including a respective non-volatile memory unit 2a, wherein the initialization data is stored, and a plurality of pins including the at least one pin I/O, RST. The pins VCC, GND, CLK are for connecting the apparatus 10 and the predetermined pins RST-2, I/O-2.

The apparatus 10 provides that the pin I/O, RST of the IC Card 2 is connected to a respective I/O, RST pin of the apparatus 10 for receiving an initialization signal from the apparatus 10 itself. The apparatus 10 also provides a connection from at least one of the predetermined pins RST-2, I/O-2 of the initialization Card 2 to a respective at least one pin I/O, RST of the first IC Card 1 for transmitting the initialization data from the non-volatile memory unit 2a of the initialization Card 2 to the non-volatile memory 1a of the first IC Card 1.

More particularly, the transmission of the initialization data from the initialization Card 2 to the IC Card 1 is executed upon reception of the initialization signal, by the side of the initialization Card 2.

Figure 1:
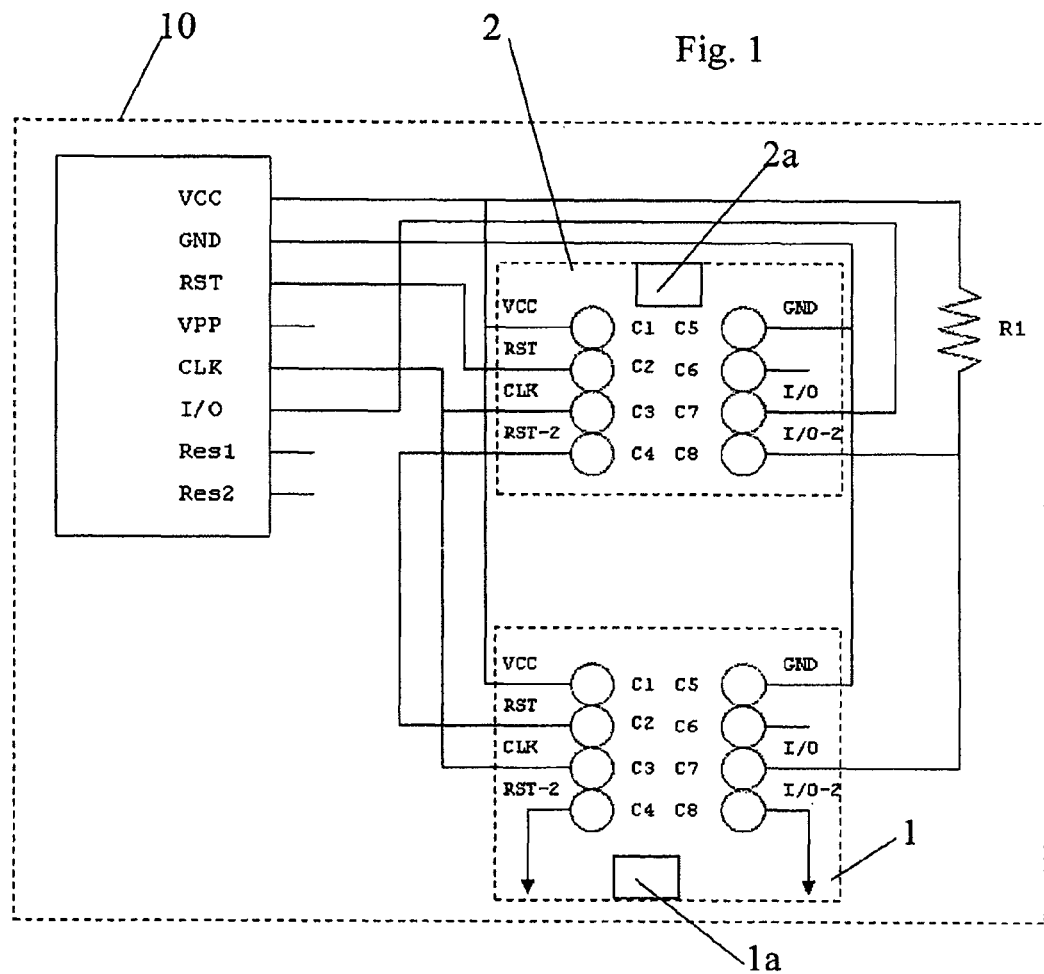
FIG. 1 schematically shows an apparatus for initializing an IC Card through an initialization Card, according to the present invention.

FIG. 1 schematically illustrates the connections between the apparatus 10 and the initialization Card 2, the apparatus 10 and the IC Card 1, and the initialization Card 2 and the IC Card 1.

More particularly, VCC, GND and CLK pins of the apparatus 10 are connected both to the VCC, GND and CLK pins of the initialization Card 2, and to the VCC, GND and CLK pins of the IC Card 1. The RST and I/O pins of the apparatus 10 are connected to the respective RST and I/O pins of the initialization Card 2. The predetermined pins RST-2, I/O-2 of the initialization Card 2 are connected to the pins I/O, RST of the IC Card 1.

The apparatus 10 may also provide a further connection for connecting the predetermined pins RST-2, I/O-2 of the IC Card 4 to the pins I/O, RST of a further IC Card 11. In this case, the initialization data is transmitted from the initialization Card 2 to the IC Card 1 upon reception of the initialization signal, and from the IC Cards 1 to the further IC Card 11.

Figure 2:
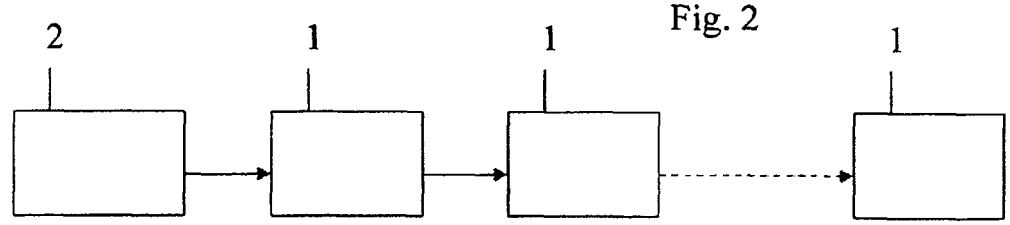
FIG. 2 schematically shows the initialization Card of FIG. 1 and a plurality of cascade connected IC Cards to be initialized, according to the present invention.

In a same manner, a plurality of IC Cards to be initialized may be cascade connected. More particularly, the predetermined pins RST-2, I/O-2 of a previous IC Card 1 in the cascade are connected to the pin I/O, RST of a following IC Card 11 in the cascade, as schematically represented in FIG. 2.

FIG. 3 schematically represents, in deeper detail, the connections of the IC Cards 1, 11 in the cascade connection. The initialization Card 2 is connected to the apparatus 10 and to the IC Card 1 of the cascade as already described with reference to FIG. 1. The IC card 1, which is the first IC Card in the cascade, is connected to the further IC Card 11, which is the IC Card following the first IC Card 1 in the cascade. According to such schema of connection, it is simple to connect a further additional IC Card to the IC Card 11.

The initialization IC Card 2 includes a counter for counting how many times the initialization signal is received from the apparatus 10. For example, the counter may be incremented each time the initialization data stored into the non-volatile memory unit 2a is transmitted to an IC Card 1 of the cascade. The transmission of the initialization data is locked when the counter is set to a predetermined threshold so that the initialization Card 2 may be advantageously used for a limited number of initializations. More particularly, the initialization Card 2 stores an initialization program for initializing the IC Card 1. The execution of the initialization program is triggered by the initialization signal received by the apparatus 10.

More particularly, the initialization program of the initialization Card 2 is programmed to control command exchange operations towards the IC Card 1. The IC Card 1 receives the commands from the initialization Card 2 and executes them.

The apparatus 10 sends commands to the initialization Card, for example, the initialization signal, but it has no direct control on the IC Card. The initialization signal triggers the initialization program responsible to start the communication with the IC Card 1, but it has no direct effect on such IC Card 1.

More particularly, with reference to the annexed figures, the following reference signs are used:

CLK, represents the Clock signal generated by the apparatus 10 for both the initialization Card 2 and the IC Card 1 connected to the apparatus; this clock signal is directed to the contact C3 according to the ISO 7816-2 protocol, also indicated as pin CLK, with reference to the description given above;

I/O, represents an open collector or open drain signal generated by the apparatus 10 for the initialization Card 2; this signal is directed to contact C7 according to the ISO 7816-2 protocol, also indicated as I/O pin;

RST, represents a Reset signal generated by the apparatus 10 for the initialization Card 2; this signal is directed to contact C2 according to the ISO 7816-2 protocol; also indicated as RST pin in the description given above;

VCC, is the supply voltage directed to contact C1 according to the ISO 7816-2, also indicated as VCC pin;

GND, is the Ground associated to contact C5 according to the ISO 7816-2, also indicated as GND pin;

Reserved 1 is an unused contact C4 in ISO 7816-2;

Reserved 2 is an unused contact C8 in ISO 7816-2; and

VPP, is the Programming voltage; it is associated to the contact C6 according to the ISO 7816-2 and it is generally unused on.

The VCC, GND, CLK contacts on the apparatus 10 are connected to all the IC Cards of the cascade and also to the initialization IC Card 2. The I/O and RST contacts on the apparatus are connected to the initialization Card 2 only. Res1, Res2, and VPP contacts on the apparatus are unconnected. The C4 contact on the initialization Card 2, also indicated as RST-2, is an output pin that drives the RST contact C2 on IC Card 1. The C8 contact on the initialization Card 2, also indicated as I/O-2, is an open collector or open drain contact that is connected to the I/O contact C7 on the IC Card 1. A pull-up resistor R1 is included on the chip of the initialization Card 2 or as an electrical component external to the initialization Card 2.

The apparatus 10 sends commands to the initialization Card 2. Each IC Card 1 sends commands to the IC Card connected as the next element in the cascade. The initialization Card 2 sends commands to the IC Card 1 through the contacts referred as C4 and C8 contacts in the ISO 7816-2 protocol. The initialization program of the initialization Card 2 implements a special command that triggers the transfer of the non-volatile memory unit 2a directly to the IC Card, using the direct connection and the C4 and C8 contacts.

The initialization data transmission between the initialization Card 2 and the IC Card 1 may be encrypted by both a shared fixed encryption key or a dynamic session key, changing randomly in each session of communication between the initialization Card 2 and an IC Card 1. This ensures additional protection to the initialization data.

The present embodiments also relate to an initialization Card 2 to be connected to an apparatus 10 of the type described above, for setting initialization data of an IC Card 1. The initialization Card 1 includes a non-volatile memory unit 2a, storing the initialization data, and a plurality of pins including pins VCC, GND, CLK for connecting the apparatus 10 and at least an I/O pin I/O, RST for receiving an initialization signal from the apparatus 10.

The initialization Card 2 includes an initialization program for transmitting, through predetermined pins RST-2, I/O-2, the initialization data, upon receipt of the initialization signal from the apparatus 10. The predetermined pins RST-2, I/O-2 are substantially pins unused by a communication compliant with a standard international protocol for IC Cards.

The present embodiments further relate to a method for storing initialization data in an IC Card 1 including a non-volatile memory, whereto the initialization data is addressed, and a plurality of pins, for receiving the initialization data. The method includes connecting the IC Card 1 to an apparatus 10 for the initialization. The method also includes providing an initialization Card 2, storing the initialization data into a respective non-volatile memory portion 2a and an initialization program for transmitting the initialization data from the initialization Card 2 to the IC Card 1. The method further includes connecting the initialization Card 2 to the apparatus 10, so that the IC Card 1 is connected to the initialization Card 2 and transmitting an initialization signal from the apparatus 10 to the initialization Card 2, for activating the initialization program.

The method also includes a step for counting the number of initialization signals sent from the apparatus 10 to the initialization Card 2. The transmission of the initialization data may be suspended if the counter reaches a predetermined threshold.

The method provides for a connection between an I/O pin of the apparatus 10 and an I/O pin of the initialization Card 2, for the transmission of the initialization signal, for a connection between predetermined pins RST-2, I/O-2 of the initialization Card 2 and the I/O pin of the IC Card 1, and for the transmission of the initialization data from the initialization Card 2 to the IC Card 1, when the initialization program is activated. Hereafter, the main steps involved in the initialization of the IC Card 1 according to the method are resumed.

The apparatus 10 sends a signal to the initialization Card 2 and waits for the execution of a command triggered by the signal. Such command triggers the transmission of initialization data to the IC Card 1.

The initialization Card 2 checks if the initialization of the IC Card 1 is allowed. More particularly, before a transmission of initialization data, the initialization Card 2 checks the following conditions and executes the corresponding operations:

if the counter has reached the threshold, it locks the transmission of initialization data;

if no one IC Card 1 is connected to the apparatus 10, it suspends the transmission of initialization data;

if the IC Card 1 is not correctly functioning, it reports an internal error;

if the IC Card 1 is an unknown IC Card, it rejects the unknown IC Card; and if the IC Card 1 is not ready to be initialized or is already initialized, it suspends the transmission of initialization data.

More particularly, if the transmission of the initialization data is not executed, a descriptive failure status is returned to the apparatus 10 so that the department responsible of the initialization may track the failures.

The initialization Card 2 sends the initialization data to the IC Card 1. The initialization data is encrypted using a shared encryption key or a dynamic session key. The IC Card 1 reports to the initialization Card 2 a success or a failure status, depending on the result of the writing operation in the non-volatile memory unit 1a.

After all the initialization data is sent to the IC Card 1, the initialization Card 2 reports to the apparatus 10 the success or the failure status. For each success the initialization Card 2 updates the counter. The apparatus 10, depending on the success/failure status received by the initialization card 2, accepts or discards the IC Card 1.

Advantageously, the apparatus 10 typically does not need any detail about the initialization data, nor does it need programming for the initialization because it is responsible for starting the process by sending the initialization signal. Moreover, the apparatus 10 may initialize multiple IC Cards having different hardware or software features. The information transmitted by the apparatus 10 is a simple initialization signal, so that a relatively large amount of time is saved, and time expensive errors in production lines are avoided.

According to the method, all the information for initializing the IC Card 1 is secret, including initialization data, initialization commands, initialization procedure, test commands, test procedures, and access keys.

Based upon the description given above, it is simple to understand that according to the method a cascade of connections between a plurality of IC Cards is also supported. The method includes connecting the predetermined pins RST-2, I/O-2 of an IC Card in the cascade with the I/O pin of a following IC Card 1 in the cascade. The method also includes connecting the I/O pin of the IC Card in the cascade to the predetermined pins RST-2, I/O-2 of a previous IC Card in the cascade and connecting the predetermined pins RST-2, I/O-2 of the initialization Card 2 to the I/O pin of a first IC Card 1 in the cascade.

Advantageously, the embodiments provide an apparatus for initializing data into an IC Card avoiding the loading of the initialization data into the apparatus. Advantageously, the apparatus is used for triggering the initialization of data from an initialization Card that stores the initialization data, keeping them secret. Conventional measures for protecting IC Card may be advantageously implemented for the initialization IC Card to protect the initialization data associated with a customer.

Advantageously, not only is the transmission of initialization data avoided, but also the programming of the apparatus, because the apparatus is used for enabling the initialization Card. Advantageously, the initialization of IC Cards may be committed to a third party without disclosing the initialization data, since the third party receives the initialization Card, but is unable to read the content of such initialization Card. Advantageously, a plurality of IC Cards may be cascade connected and initialized together with the same initialization data.

That which is claimed:

1. An apparatus for storing initialization data in an integrated circuit (IC) Card, the IC Card comprising an IC Card non-volatile memory to which the initialization data is addressed and a plurality of IC Card pins including IC Card connecting pins for connecting the IC Card to the apparatus and at least one IC Card I/O pin for receiving the initialization data, the apparatus comprising:
an initialization Card comprising
an initialization Card non-volatile memory unit for storing the initialization data, and
a plurality of initialization Card pins including at least one initialization Card I/O pin, and initialization Card connecting pins,
the at least one initialization Card I/O pin for receiving an initialization signal; and
at least one connection from a given one of the plurality of initialization Card pins to the at least one IC Card I/O pin of the IC Card for transmitting the initialization data from said initialization Card to the IC Card upon reception of the initialization signal.

2. The apparatus according to claim 1 further comprising an apparatus I/O pin, and wherein the apparatus I/O pin is coupled to the least one initialization Card I/O pin.

3. The apparatus according to claim 1 wherein the apparatus is also for storing initialization data in a second IC Card; the second IC Card comprising at least one second IC Card I/O pin coupled to a given one of the plurality of IC Card pins; the initialization data being transmitted from said initialization Card to the IC card, upon reception of the initialization signal, and from the IC Card to the second IC card.

4. The apparatus according to claim 3 wherein the apparatus is also for storing initialization data in a plurality of cascade connected IC Cards, the given one of the plurality of IC Card pins of a previous IC Card being cascade connected to the at least one IC Card I/O pin of a following IC Card of the plurality of cascade connected IC cards.

5. The apparatus according to claim 4 wherein said initialization Card further comprises a counter for counting a number of received initialization signals.

6. The apparatus according to claim 5 wherein transmission of the initialization data is locked when said counter is set to a threshold.

7. An initialization Card for setting initialization data of an integrated circuit (IC) Card, the initialization Card comprising:
an initialization Card non-volatile memory unit for storing the initialization data;
a plurality of initialization Card pins including an initialization Card connecting pin for connecting an apparatus and at least one initialization Card I/O pin for receiving an initialization signal from the apparatus; and
an initialization program for transmitting the initialization data through given ones of a plurality of pins upon receipt of the initialization signal from the apparatus.

8. The initialization Card according to claim 7 further comprising a counter for counting a number of received initialization signals.

9. The initialization Card according to claim 8 wherein transmission of the initialization data is locked when said counter is set to a threshold.

10. A method for storing initialization data in an integrated circuit (IC) Card, the IC Card comprising an IC Card non-volatile memory for addressing the initialization data and a plurality of IC Card pins for receiving the initialization data, the IC Card being coupled to an apparatus for initialization, the method comprising:
providing an initialization Card having an initialization Card non-volatile memory portion;
storing the initialization data into the initialization Card non-volatile memory portion; and
storing an initialization program into the initialization Card non-volatile memory portion for transmitting the initialization data from the initialization Card to the IC Card;
coupling the initialization Card to the apparatus so that the IC Card is coupled to the initialization Card; and
transmitting an initialization signal from the apparatus to the initialization Card for activating the initialization program.

11. The method according to claim 10 further comprising counting the number of initialization signals sent from the apparatus to the initialization Card, the transmission of the initialization data being suspended if the counter reaches a threshold.

12. The method according to claim 11 further comprising coupling an apparatus I/O pin and an initialization Card I/O pin for transmission of the initialization signal, and coupling a given one of the plurality of initialization Card pins to an IC Card I/O pin for the transmission of the initialization data from the initialization Card to the IC Card when the initialization program is activated.

13. The method according to claim 12 further comprising providing a cascade connection between a plurality of IC Cards, providing the cascade connection comprising:
coupling given ones of the plurality of IC Card pins in the cascade and the IC Card I/O pin of a following IC Card in the cascade;
coupling the IC Card I/O pin of the IC Card in the cascade and the given ones of the plurality of the IC Card pins of a previous IC Card in the cascade; and
coupling the given ones of the plurality of initialization Card pins and an IC Card I/O pin of a first IC Card in the cascade.

14. A method for storing initialization data in an integrated circuit (IC) Card, the IC Card comprising an IC Card non-volatile memory to which the initialization data is addressed and a plurality of IC Card pins for receiving the initialization data, the method comprising:
coupling the initialization Card to the IC Card, the initialization Card comprising an initialization Card non-volatile memory storing the initialization data and storing an initialization program for transmitting the initialization data from the initialization Card to the IC Card; and
transmitting an initialization signal to the initialization Card for activating the initialization program.

15. The method according to claim 14 further comprising counting the number of initialization signals sent to the initialization Card, the transmission of the initialization data being suspended if the counter reaches a threshold.

16. The method according to claim 15 further comprising coupling an I/O pin and an initialization Card I/O pin for transmission of the initialization signal, and coupling a given one of the plurality of initialization Card pins to an IC Card I/O pin for the transmission of the initialization data from the initialization Card to the IC Card when the initialization program is activated.

17. The method according to claim 16 further comprising providing a cascade connection between a plurality of IC Cards, providing the cascade connection comprising:

coupling given ones of the plurality of IC Card pins in the cascade and the IC Card I/O pin of a following IC Card in the cascade;

coupling the IC Card I/O pin of the IC Card in the cascade and the given ones of the plurality of the IC Card pins of a previous IC Card in the cascade; and coupling the given ones of the plurality of initialization Card pins and an IC Card I/O pin of a first IC Card in the cascade.

* * * * *